United States Patent
Sun et al.

(10) Patent No.: US 11,049,017 B2
(45) Date of Patent: Jun. 29, 2021

(54) DEVICE AND METHOD FOR DETERMINING CONVOLUTIONAL NEURAL NETWORK MODEL

(71) Applicant: FUJITSU LIMITED, Kawasaki (JP)

(72) Inventors: Li Sun, Beijing (CN); Song Wang, Beijing (CN); Wei Fan, Beijing (CN); Jun Sun, Beijing (CN)

(73) Assignee: FUJITSU LIMITED, Kawasaki (JP)

( * ) Notice: Subject to any disclaimer, the term of this patent is extended or adjusted under 35 U.S.C. 154(b) by 940 days.

(21) Appl. No.: 15/723,457

(22) Filed: Oct. 3, 2017

(65) Prior Publication Data
US 2018/0157976 A1 Jun. 7, 2018

(30) Foreign Application Priority Data
Dec. 1, 2016 (CN) .......................... 201611095600.6

(51) Int. Cl.
*G06N 3/08* (2006.01)
*G06N 3/10* (2006.01)
*G06N 3/04* (2006.01)

(52) U.S. Cl.
CPC ........... *G06N 3/082* (2013.01); *G06N 3/0454* (2013.01); *G06N 3/10* (2013.01)

(58) Field of Classification Search
CPC .................................................. G06N 3/082
See application file for complete search history.

(56) References Cited

U.S. PATENT DOCUMENTS

| 2004/0012576 | A1* | 1/2004 | Cazier | G06T 11/00 345/204 |
| 2016/0232423 | A1* | 8/2016 | Zhong | B60S 1/0844 |
| 2016/0239736 | A1* | 8/2016 | Sarah | G06N 3/082 |
| 2016/0358070 | A1* | 12/2016 | Brothers | G06N 3/0454 |

FOREIGN PATENT DOCUMENTS

CN 106228185 A * 12/2016

OTHER PUBLICATIONS

Rahman, Ahmad Fuad Rezaur, and Michael C. Fairhurst. "Measuring classification complexity of image databases: a novel approach." Proceedings 10th International Conference on Image Analysis and Processing. IEEE, 1999. (Year: 1999).*
Peters, Richard Alan. "Image complexity measurement for predicting target detectability." (1988). (Year: 1988).*

* cited by examiner

Primary Examiner — Hal Schnee
(74) Attorney, Agent, or Firm — Staas & Halsey LLP

(57) ABSTRACT

Provided are device and method for determining a Convolutional Neural Network (CNN) model. The device for determining the CNN model includes: a first determination unit configured to determine complexity of a database including multiple samples; a second determination unit configured to determine a classification capability of a CNN model applicable to the database based on the complexity of the database; a third determination unit configured to acquire classification capability of each candidate CNN model; and a matching unit configured to determine the CNN model applicable to the database based on the classification capability of each candidate CNN model. With the device and method for determining the CNN module, a design process of CNN model can be simplified.

20 Claims, 3 Drawing Sheets

DEVICE AND METHOD FOR DETERMINING CONVOLUTIONAL NEURAL NETWORK MODEL

CROSS-REFERENCE TO RELATED APPLICATIONS

This application claims the benefit and priority of Chinese Application No. 201611095600.6, filed on Dec. 1, 2016, entitled "device and method for determining convolutional neural network model", the entire disclosure of which is incorporated herein by reference.

BACKGROUND

1. Field

Embodiments of the present disclosure relates to the technical field of machine learning, and in particular to device and method for determining a Convolutional Neural Network (CNN) model.

2. Description of the Related Art

In this section, background information related to the present disclosure is described, which is not necessarily the prior art.

Depth learning technologies have been widely applied in computer vision field. As one of the depth learning technologies, Convolutional Neural Network (CNN) greatly improves the accuracy in image classification and brings a qualitative change to an image classification task. An appropriate CNN model can be designed for any database. The CNN model may be used for training samples in the database to obtain a relationship between the samples in the database and labels of the samples. Here, the sample in the database may be an image.

However, it is difficult for an ordinary person to design and adjust a CNN model due to lacking of professional background. In addition, the designing and adjusting of a traditional CNN model is closely related to a professional technique of an engineer. Generally, an optimal model can be obtained via a large quantity of experiments.

In the present disclosure, it is desired to provide a solution for simplifying the design process of the CNN model to make an ordinary person, as a user, able easily design and adjust the CNN model, and it is desired to design a CNN model more closely matching with the database.

SUMMARY

In this section, it is provided a general summary of the present disclosure, instead of fully disclosing a full scope or all features of the present disclosure.

An object of the present disclosure is to provide device and method for determining a Convolutional Neural Network (CNN) model. With the device and method, a design process of the CNN model can be simplified to make an ordinary person, as a user, able easily design and adjust the CNN model, and a CNN model more matching with a database can be designed.

A device for determining a CNN model is provided according to an aspect of the present disclosure. The device includes: a first determination unit, configured to determine complexity of a database comprising multiple samples; a second determination unit, configured to determine a classification capability of a CNN model applicable to the database based on the complexity of the database; a third determination unit, configured to acquire classification capability of each of the multiple candidate CNN models; and a matching unit, configured to determine the CNN model applicable to the database based on the classification capability of each candidate CNN model and the classification capability of the CNN model applicable to the database.

A method for determining a CNN model is provided according to another aspect of the present disclosure. The method includes: determining complexity of a database comprising multiple samples; determining a classification capability of a CNN model applicable to the database based on the complexity of the database; acquiring classification capability of each of the multiple candidate CNN models; and determining the CNN model applicable to the database based on the classification capability of each candidate CNN model and the classification capability of the CNN model applicable to the database.

A program product is provided according to another aspect of the present disclosure. The program product includes machine readable instruction codes stored therein. When reading and executing the instruction codes, a computer can perform the method for determining the CNN model according to the present disclosure.

A machine readable memory medium is provided according to another aspect of the present disclosure. A program product including machine readable instruction codes stored therein is carried on the machine readable memory. When reading and executing the instruction codes, a computer can perform the method for determining a CNN model according to the present disclosure.

With the device and method for determining the CNN model according to the present disclosure, the classification capability of the CNN model applicable to a database can be determined based on the complexity of the database, and thus an appropriate CNN model can be selected from the candidate CNN models. In this case, the appropriate CNN model can be determined based on the complexity of the database to make the determined CNN model more matching with the database. Furthermore, the design process of CNN model is simplified, hence an appropriate CNN model for the database can also be designed by an ordinary person.

The description and specific examples in the summary are only for illustration, and are not intended to limit the scope of the present disclosure.

BRIEF DESCRIPTION OF THE DRAWINGS

The drawings described herein are only for illustrating selected embodiments instead of illustrating all possible embodiments, and are not intended to limit the scope of the present disclosure. In the drawings.

DETAILED DESCRIPTION

Figure 1:
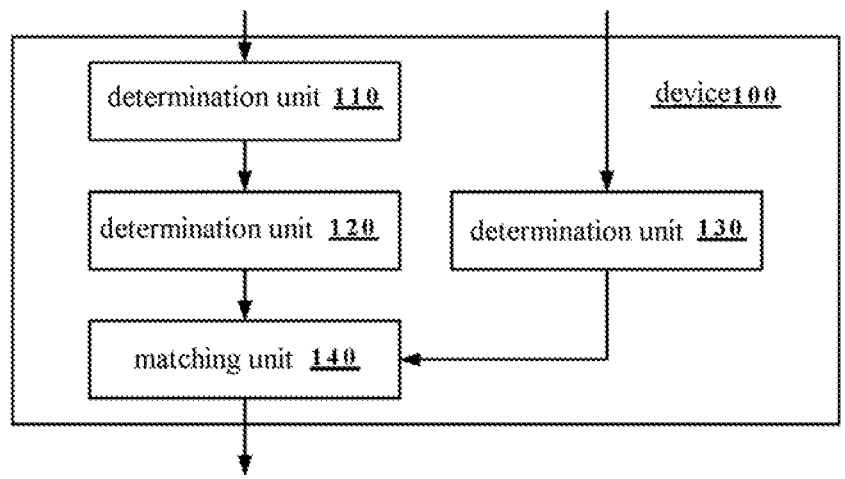
FIG. 1 shows a block diagram of a structure of a device for determining a CNN model according to an embodiment of the present disclosure.

Although the present disclosure may be modified and replaced in various manners, specific embodiments of the present disclosure are shown in the drawings as examples and are described in detail hereinafter. It should be understood that, the descriptions of the specific embodiments are not intended to limit the present disclosure to the disclosed forms. And in reverse, the object of the present disclosure is to cover all modifications, equivalents and replacements falling within the spirit and scope of the present disclosure. It should be noted that, a corresponding reference numeral indicates a corresponding component throughout the drawings.

In the following, examples of the present disclosure are described more fully with reference to the drawings. The following description is substantially only illustrative, and is not intended to limit the application or use of the present disclosure.

In the following, exemplary embodiments are provided, so that the present disclosure is described in detail and fully shows its scope to those skilled in the art. Many examples of specific details such as a specific unit, a device and a method are set forth, hence the present disclosure is understood in detail. It is apparent to those skilled in the art that, the exemplary embodiments can be implemented in various different forms without using the specific detail, none of which should be explained to limit the scope of the present disclosure. In some exemplary embodiments, well-known processes, well-known structures and well-known technologies are not described in detail.

In the following, it is described a device 100 for determining a CNN model according to an embodiment of the present disclosure in conjunction with FIG. 1.

The device 100 for determining the CNN model according to the present disclosure includes a determination unit 110, a determination unit 120, a determination 130 and a matching unit 140.

According to the embodiment of the present disclosure, the determination unit 110 may determine complexity of a database including multiple samples. Here, the database may be a specific database inputted to the device 100 by a user, i.e., the user hopes to design an appropriate CNN model for this database. Furthermore, the sample in the database may include a text, an image and the like. The determination unit 110 may transmit the complexity of the database to the determination unit 120 after determining the complexity of the database.

According to the embodiment of the present disclosure, the determination unit 120 may determine a classification capability of a CNN model applicable to the database based on the complexity of the database. Herein, the determination unit 120 may acquire the complexity of the database from the determination unit 110 and determine the classification capability of the CNN model applicable to the database based on the acquired complexity of the database. That is to say, the classification capability of the CNN model applicable to the database is a classification capability that a CNN model is desired to reach. Furthermore, the determination unit 120 may transmit the determined classification capability of the CNN model applicable to the database to the matching unit 140.

According to the embodiment of the present disclosure, the determination unit 130 may acquire classification capability of each of multiple candidate CNN models. Herein, the multiple candidate CNN models may be candidate models inputted by the user, or may be candidate models generated by the device 100 based on the inputted database. In other words, the matching unit 140 selects a most appropriate CNN model from these candidate CNN models. The classification capability of the candidate CNN model is a classification capability that the candidate CNN model actually reaches. Furthermore, the determination unit 130 may transmit the classification capabilities of the respective candidate CNN models to the matching unit 140.

According to the embodiment of the present disclosure, the matching unit 140 may determine the CNN model applicable to the database based on the classification capabilities of the respective candidate CNN models and the classification capability of the CNN model applicable to the database. Herein, the matching unit 140 may acquire the classification capability of the CNN model applicable to the database from the determination unit 120, acquire the classification capabilities of the candidate CNN models from the determination unit 130, and then select the CNN model applicable to the database from the candidate CNN models. Furthermore, the matching unit 140 may output the selected CNN model applicable to the database from the device 100.

Accordingly, with the device 100 for determining the CNN model according to the present disclosure, the classification capability of the CNN model applicable to a database can be determined based on the complexity of the database, and the actual classification capabilities of the candidate CNN models may be also determined, hence to select the appropriate CNN model from the candidate CNN models. In this case, the appropriate CNN model can be determined based on the complexity of the database, to make the determined CNN model more matching with the database in classification capability. Further, the CNN model design process is simplified, hence an appropriate CNN model for the database can be designed by an ordinary person.

According to an embodiment of the present disclosure, the determination unit 110 may calculate the complexity of the database in many manners which is not limited herein, as long as the complexity of the database can be reasonably represented. For example, in the case that the sample in the database is an image, the complexity of the database can be determined based on a distribution relationship of a feature matrix formed by feature descriptions of the sample, such as feature values or distance metrics. For another example, several indexes affecting the difficulty of classifying the samples in the database may be selected, and then the complexity of the database is quantized with these indexes. Such method is described in detail hereinafter.

According to an embodiment of the present disclosure, the determination unit 110 selects multiple parameters from a parameter group and determines the complexity of the database based on the selected multiple parameters. The parameter group includes a number of categories, an average number of samples, a sample equalization degree, a background complexity and a target clarity. The number of categories represents the number of categories for multiple samples in the database, the average number of samples represents an average value of the numbers of samples of the respective categories in the database, the sample equalization degree represents an equalization degree among the numbers of samples of the respective categories in the database, the background complexity represents complexity of an image background of the sample in the database, and the target clarity represents a difficulty of identifying a target from the sample in the database. The above five types of parameters affecting the classification difficulty are listed in the present disclosure. And the determination unit 110 may select several parameters from the above parameter group, that is, selects any two, three, four or five parameters to determine the complexity of the database. Of course, other parameters affecting the classification difficulty may be determined as basis for calculating the complexity.

Here, the number of categories n represents the number of categories for multiple samples (such as images) in the database, i.e., the number of labels in the database, and n is an integer greater than 1.

The average number of samples m represents the average value of the numbers of samples of the respective categories in the database, that is, m=the total number of samples in the database/n. And it may be defined herein that m is greater than or equal to 500.

The sample equalization degree bd represents an equalization degree among the numbers of samples of the respective categories in the database, that is, bd=standard deviation of the number of samples/m, and bd is greater than or equal to 1.

The background complexity ib represents complexity of an image background of a sample in the database, and it is assumed herein that complexities of backgrounds of all samples in the database are similar. It is well known that an image includes a background portion and a foreground portion, and ib represents the complexity of the background portion. For example, if a background of an image in the database is white, then it may be considered that a background of the database is simple. If the background of the image in the background is color, then it may be considered that the background of the database is complex. Herein, values of ibs in different levels may be defined, and ib may range from 0 to 9 inclusively. An approach for defining the value of ib is shown with following formula.

$$ib = \begin{cases} 0 & \text{simple background} \\ 1 & \text{complex background} \end{cases}$$

The target clarity cd represents the difficulty of identifying the target from the sample in the database, and it is assumed herein that target clarities of all samples in the database are similar. The target clarity cd represents the difficulty that the target can be identified. And a factor affecting cd includes both background portion and foreground portion of an image. For example, in the case of a same background, if the foreground portion of the image is one number, then the number can be easily identified, or, if the foreground portion of the image includes multiple numbers overlapped with one another, then it is difficult to identify the numbers. Herein, values of cds in different levels may be defined, and cd may range form 0 to 9 inclusively. And an approach for defining the value of cd is shown with the following formula.

$$cd = \begin{cases} 1 & \text{very easy to be identified} \\ 3 & \text{easy to be identified} \\ 5 & \text{normal} \\ 7 & \text{difficult to be identified} \\ 9 & \text{very difficult to be identified} \end{cases}$$

According to an embodiment of the present disclosure, the determination unit 110 may be configured to determine weight and score of each of the multiple parameters and determine the complexity of the database by weighting the score of each parameter and summing the weighted scores.

For example, in the case that all of the above five parameters are selected, the complexity of the database may be calculated with the following formula:

The complexity of the database=score of n×weight of n+score of m×weight of m+score of bd×weight of bd+score of ib×weight of ib+score of cd×weight of cd.

Here, weights of n, m, bd, ib and cd are each in a range from 0 to 1 inclusively, and a sum of the weight of n, weight of m, weight of bd, weight of ib and weight of cd equals to 1.

Of course, in the case that a portion of the above parameters are selected, the complexity of the database may be determined by weighting the scores of the selected parameters and summing the weighted scores.

Herein, the score of the parameter may be defined based on the definition of the parameter. The scores of the above five parameters may be defined, for example, as follows:

$$\text{Score of } n = \begin{cases} 100 \times (1 - 10/n) & n \geq 20 \\ 2.5 \times n & 2 \leq n < 20 \end{cases}$$

$$\text{Score of } m = 50000/m$$

$$\text{Score of } bd = 100 \times (1 - 1/bd)$$

$$\text{Score of } ib = \begin{cases} 0 & \text{simple background} \\ 100 & \text{complex background} \end{cases}$$

$$\text{Score of } cd = 10 \times cd + 10$$

According to an embodiment of the present disclosure, the determination unit 110 may form a comparison matrix based on relative importance between each two parameters of the multiple parameters by using an analytic hierarchy process, and determine the weights of the respective parameters based on the comparison matrix.

In the case that all of the above five parameters are selected, and a formed comparison matrix A=[$a_{ij}$] is a 5×5 matrix. That is to say, both of i and j≤5. If i=j, then $a_{ij}$=1. If i≠j, then $a_{ij}$ indicates an importance degree of an i-th element with respect to a j-th element. With the increasing $a_{ij}$ the i-th element is more important with respect to the j-th element, and $a_{ij}$=1/$a_{ji}$.

According to an embodiment of the present disclosure, the element $a_{ij}$ in the comparison matrix may be calculated with the following method. The method includes: making an element (if the element exists) other than the i-th element and j-th element constant and selecting several CNN models such as five CNN modes with different scales (i.e., different classification capabilities); calculating a first classification accuracy (i.e., a correct rate of a classification result) of the selected CNN models in the case that the i-th element is constant and the j-th element is changed; calculating a second classification accuracy of the selected CNN models in the case that the j-th element is constant and the i-th element is changed; and determining $a_{ij}$ based on the first and second classification accuracies.

According to an embodiment of the present disclosure, in the case that the comparison matrix is determined, maximum feature values of the comparison matrix may be normalized, to determine weights of the respective parameters.

As described in the above, the determination unit 110 may calculate the complexity of the database after determining the score and weight of each of the parameters. The above is only an example for calculating the complexity of the database, and those skilled in the art may calculate the complexity of the database with other methods.

According to an embodiment of the present disclosure, the classification capability of the CNN model for the database should be stronger in the case that the database is more complex. In other words, the classification capability of the CNN model applicable to the database is directly proportional to the complexity of the database. Therefore, according to an embodiment of the present disclosure, the determination unit 120 may determine a classification capability of a CNN model applicable to the database, to make the classification capability of the CNN model applicable to the database stronger in the case that the complexity of the database indicates that the database is more complex.

According to an embodiment of the present disclosure, the classification capability determined by the determination unit 120 may be a numerical value. For example, the classification capability of the CNN model applicable to the database, $\chi_k$, may be calculated based on a function, $\chi_k = \eta$ (complexity of database). In an example, the classification capability of the CNN model applicable to the database, $\chi_k$, may be calculated with the following formula:

$$\chi_k = (\text{complexity of database})/10$$

According to an embodiment of the present disclosure, the determination unit 120 may further determine a value range of the classification capability of the CNN model applicable to the database based on the complexity of the database. For example, in the case that the classification capability of the CNN model applicable to the database, $\chi_k$, is determined according to the above embodiment, a left neighborhood $\Delta l$ and a right neighborhood $\Delta r$ of the classification capability may be determined, hence the value range of the classification capability of the CNN model applicable to the database can be determined as $[\chi_k - \Delta l, \chi_k + \Delta r]$. The left and right neighborhoods of the classification capability can be set as empirical values, preferably, $\Delta l = 0.5$ and $\Delta r = 0.5$.

As described in the above, the determination unit 120 determines the classification capability or the value range of the classification capability of the CNN model applicable to the database based on the complexity of the database. Next, the determination unit 120 may transmit the classification capability or the value range of the classification capability of the CNN model applicable to the database to the matching unit 140.

In the following, the determination unit 130 according to the embodiments of the present disclosure is described.

According to an embodiment of the present disclosure, the determination unit 130 may be configured to determine a first parameter of a candidate CNN model and calculate a classification capability of the candidate CNN model based on the first parameter of the candidate CNN model. The first parameter represents a full extent to which the candidate CNN model is trained.

According to an embodiment of the present disclosure, the full extent to which the candidate CNN model is trained affects greatly the classification capability of the candidate CNN model. Generally, the classification capability of the candidate CNN model is stronger if the candidate CNN model is trained more fully. According to the embodiment of the present disclosure, the full extent to which the candidate CNN model is trained may be estimated with any method, which is not limited herein. And the full extent to which the candidate CNN model is trained may be related to the number of convolution layers of the candidate CNN model.

According to an embodiment of the present disclosure, the determination unit 130 is further configured to calculate the classification capability of the candidate CNN model based on the first parameter, a second parameter and a third parameter of the candidate CNN model. The second parameter represents the number of convolution layers of the candidate CNN model, and the third parameter represents a multiplication factor of the number of feature maps of the candidate CNN model.

Figure 2:
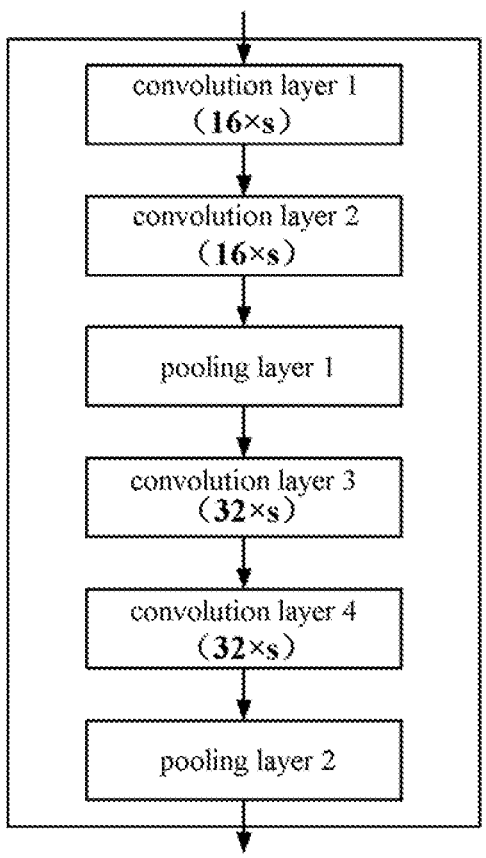
FIG. 2 shows a schematic structural diagram of a CNN model according to an embodiment of the present disclosure.

FIG. 2 shows a schematic structural diagram of a CNN model according to an embodiment of the present disclosure. The CNN model may include one or more convolution layers and one or more pooling layers. Herein, the pooling layer may be replaced with other similar operations. The convolution layer is configured to extract a feature of a sample (such as an image) in the database, and the pooling layer is configured to reduce a computational effort for the CNN model. The convolution layer and the pooling layer are each arranged with a processing template. When being processed by the convolution layer, the feature map of the sample is processed with the template of the convolution layer, and when being processed by the pooling layer, the feature map of the sample is processed with the template of the pooling layer. After being processed by the pooling layer, the feature map has both its length and width reduced by a half. The CNN model shown in FIG. 2 includes four convolution layers and two pooling layers. The sample in the database is processed by a convolution layer 1, a convolution layer 2, a pooling layer 1, a convolution layer 3, a convolution layer 4 and a pooling layer 2. Of course, the CNN model may include another number of convolution layers and another number of pooling layers. And the convolution layers and pooling layers may be arranged at locations different from those shown in FIG. 2. Further, only a portion of the CNN model is shown in FIG. 2, and the CNN model may include other portions.

According to an embodiment of the present disclosure, a second parameter N of the CNN model represents the number of convolution layers of the CNN model, and may also be referred to as a depth parameter of the CNN model, where N is a positive integer. For example, the second parameter N of the CNN model shown in FIG. 2 is 4.

In an embodiment of the present disclosure, a third parameter s of the CNN model represents a multiplication factor of the number of feature maps of the CNN model, and may also be referred to as a width parameter of the CNN model, where s is a positive number. Herein, the number of the feature maps of the sample in the database which are processed by the first convolution layer of the CNN model equals to a product of the third parameter s multiplied by the number of basic feature maps. That is to say, the third parameter is a value obtained by dividing the number of the feature maps of the sample in the database which are processed by the first convolution layer of the CNN model by the number of basic feature maps. Herein, the number of the feature maps of the sample in the database which are processed by the first convolution layer of the CNN model depends on a template of the first convolution layer. The number of the basic feature maps may be human-defined numerical values such as 8, 16, 32 or 64. In the example shown in FIG. 2, the number of the basic feature maps is 16 and the number of feature maps of the sample which is processed by the first convolution layer is 16×s.

According to an embodiment of the present disclosure, the CNN model is described with the first parameter, the second parameter N and the third parameter s, since the three parameters are important parameters for the CNN model and determine, to a certain extent, a classification capability of the CNN model. In addition, according to an embodiment of the present disclosure, the width of the CNN model is described with the third parameter s, thereby describing the number of the feature maps more simply.

According to an embodiment of the present disclosure, the determination unit 130 may calculate the classification capability of the candidate CNN model based on the first, second and third parameters of the candidate CNN model. For example, the classification capability of the candidate CNN model, $\chi$, may be calculated as:

$$\chi = g(N,s) \times G,$$

where, N represents the second parameter of the candidate CNN model, s represents the third parameter of the candidate CNN model, g(N,s) represents a function taking N and s as variables and G represents the first parameter of the candidate CNN model.

Of course, in addition to the first parameter, second parameter and third parameter, the determination unit 130 may further calculate the classification capability of the CNN model based on other parameters, such as a normalized magnitude of samples, a convolution step size and the magnitude of a convolution sum. That is to say, the function g(N,s) may take a parameter other than N and s as a variable.

As described in the above, the determination unit 130 may determine the classification capabilities of the respective candidate CNN models.

According to an embodiment of the present disclosure, the determination unit 130 may further establish a correspondence between the candidate CNN models and the classification capabilities, and the matching unit 140 may determine a candidate CNN model corresponding to the classification capability of the CNN model applicable to the database as the CNN model applicable to the database.

According to an embodiment of the present disclosure, the determination unit 130 may establish a correspondence between the candidate CNN models and their classification capabilities $\chi$ after determining the classification capabilities of the candidate CNN models, $\chi$ and may transmit the correspondence to the matching unit 140. Next, the matching unit 140 may determine the CNN model applicable to the database based on the correspondence. For example, the matching unit 140 acquires the classification capability of the CNN model applicable to the database, $\chi_k$, from the determination unit 120, and then determines a candidate CNN model corresponding to the classification capability $\chi_k$ as a final CNN model applicable to the database.

According to an embodiment of the present disclosure, the determination unit 130 may be configured to group multiple candidate CNN models to group candidate CNN models having same or similar classification capabilities into a same group, and may be configured to make the candidate CNN models within the same group correspond to a representative classification capability of the same or similar classification capabilities corresponding to the group.

In the case that the determination unit 130 determines the classification capabilities of the respective candidate CNN models, $\chi$, as described in the above, the classification capabilities of different candidate CNN models are disperse. In this case, the candidate CNN models may be grouped based on the classification capabilities, to further accelerate the calculation. An example of grouping the candidate CNN models is shown in Table 1.

TABLE 1

| $\chi$ | 5.4 | 5.7 | 6 | 6.2 | 6.3 | 6.5 | 6.6 |
|---|---|---|---|---|---|---|---|
| Candidate CNN models | N = 4, s = 1 | N = 4, s = 2 | N = 4, s = 4 | N = 6, s = 5 | N = 8, s = 4 | N = 8, s = 6 | N = 8, s = 6 |
|  | N = 5, s = 1 | N = 5, s = 2 | N = 5, s = 4 | N = 4, s = 6 | N = 4, s = 8 | N = 6, s = 10 | N = 7, s = 10 |
|  | N = 6, s = 1 | N = 8, s = 1 | N = 8, s = 2 | N = 7, s = 4 | N = 5, s = 7 | N = 7, s = 8 | N = 9, s = 7 |
|  | N = 7, s = 0.7 | N = 7. s = 1 | N = 7, s = 3 | N = 8, s = 3 | N = 6, s = 7 | N = 7, s = 9 | N = 12, s = 5 |

As shown in Table 1, the candidate CNN models are represented with the second parameter N and third parameter s in Table 1 since the two parameters are important parameters for the CNN models. For example, the candidate CNN models represented with: N=4,s=1; N=5,s=1; N=6,s=1 and N=7,s=0.7 are grouped into a first group of candidate CNN models. The candidate CNN models in the first group have same or similar classification capabilities from which a representative classification capability can be selected. For example, a representative classification capability of the first group of candidate CNN models is 5.4, hence actual classification capabilities of this group of candidate CNN models, for example, may range from 5.25 to 5.55 inclusively. According to an embodiment of the present disclosure, candidate CNN models in a group correspond to a representative classification capability of this group. For example, the candidate CNN models in the first group correspond to the representative classification capability 5.4. Seven groups of candidate CNN models are totally shown in Table 1, and the candidate CNN models in each of the groups correspond to a representative classification capability of the group. It should be noted that, the representative classification capabilities of the respective groups are not uniformly distributed in Table 1, since the classification capabilities of the CNN models are not uniformly distributed. For example, there may be many CNN models in a range from 6.2 to 6.6 inclusively, hence an interval between groups is small. In addition, a representative classification capability of a group of candidate CNN models may be determined with multiple methods, for example, by acquiring a median value of classification capabilities of all candidate CNN models in the group, which is not limited herein.

As described in the above, the determination unit 130 may group multiple candidate CNN models to make candidate CNN models in a group correspond to a representative classification capability corresponding to the group. Further, the determination unit 130 may transmit the correspondence to the matching unit 140. Next, as described in the above, the matching unit 140 acquires the classification capability of the CNN model applicable to the database, $\lambda_k$, from the determination unit 120, and then determines a candidate CNN model corresponding to the classification capability $\chi_k$ as a final CNN model applicable to the database. For example, if the classification capability of the CNN model applicable to the database, $\chi_k$, acquired from the determination unit 120 is 5.4, then the matching unit 140 may search out candidate CNN models represented with: N=4,s=1;

N=5,s=1; N=6,s=1 and N=7,s=0.7, which correspond to the classification capability 5.4 from the correspondence table shown in Table 1 and thus determine the four candidate CNN models as CNN models applicable to the database. For another example, the classification capability of the CNN model applicable to the database, $\chi_k$, acquired from the determination unit 120 is 6.22, and 6.22 is most closed to a representative classification capability 6.2 in the correspondence table shown in Table 1. In this case, the matching unit 140 may search out candidate CNN models represented with: N=6,s=5; N=4,s=6; N=7,s=4 and N=8,s=3, which correspond to the classification capability 6.2, and then determine the four candidate CNN models as CNN models applicable to the database. For another example, if the classification capability of the CNN model applicable to the database, $\chi_k$, acquired from the determination unit 120 is in a range from 6.1 to 6.3 inclusively, then the matching unit 140 may search out groups with the representative classification capabilities 6.2 and 6.3 from the correspondence table shown in Table 1 as groups of candidate CNN models, of which the typical classification capabilities are within the range, and then determine the CNN models in the two groups as CNN models applicable to the database.

As aforementioned, the device 100 for determining the CNN model may determine the classification capability of the CNN model applicable to the database based on the complexity of the database and can select a candidate CNN model with a classification capability most matching with the database from candidate CNN models. Further, in order to reduce the computational effort, the candidate CNN models may be grouped based on their classification capabilities, and a representative classification capability of the group is determined. In this way, it is only needed to search out a representative classification capability most closed to the classification capability of the CNN model applicable to the database, $\chi_k$, or to search out a representative classification capability within the range [$\chi_k-\Delta l$, $\chi_k+\Delta r$] of the classification capability of the CNN model applicable to the database, and search out a candidate CNN model corresponding to the representative classification capability, thereby simplifying the searching process.

Figure 3:
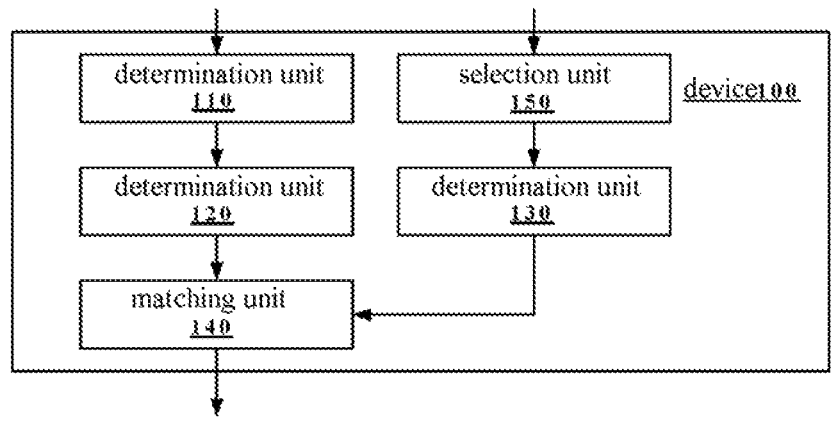
FIG. 3 shows a block diagram of a structure of a device for determining a CNN model according to another embodiment of the present disclosure.

FIG. 3 shows a block diagram of a structure of a device for determining a CNN model according to another embodiment of the present disclosure.

As shown in FIG. 3, a device 100 for determining a CNN model includes a determination unit 110, a determination unit 120, a determination unit 130, a matching unit 140 and a selection unit 150. The determination unit 110, determination unit 120, determination 130 and matching unit 140 are described in the above and are not described hereinafter.

According to the embodiment of the present disclosure, the selection unit 150 may be configured to select multiple candidate CNN models. Herein, the selection unit 150 may select an appropriate CNN model from established sample CNN models as a candidate CNN model, alternatively, may establish sample CNN models by itself and select an appropriate CNN model from its established sample CNN models as a candidate CNN model. Further, the selection unit 150 may be configured to transmit the selected candidate CNN model to the determination unit 130.

According to an embodiment of the present disclosure, the selection unit 150 may establish multiple sample CNN models, and select multiple sample CNN models of which second and third parameters meet a predetermined condition as multiple candidate CNN models.

According to an embodiment of the present disclosure, the selection unit 150 may establish multiple sample CNN models in multiple manners. It is mentioned in the above that, the second parameter and third parameter are important parameters for a CNN model, and decide, to a certain extent, the performance of the CNN model. Therefore, the selection unit 150 may select a model, of which the second parameter and third parameter meet the predetermined condition, from the established sample CNN models as a candidate CNN model. In this case, the matching unit 140 may determine a more accurate CNN model applicable to the database.

Herein, the predetermined condition may define ranges of the second parameter and third parameter. A too great second parameter or third parameter may cause an overlong time for training the database with the CNN model, while a too small second parameter or third parameter may affect a classification precision of the CNN model. Therefore, reasonable ranges must be set respectively for the second and third parameters. The ranges of the second and third parameters may be set based on experience or in an experiment manner.

According to an embodiment of the present disclosure, the selection unit 150 may establish each sample CNN model of the multiple sample CNN models in the following way: in the case that the length and width of a feature map of the sample CNN model are both reduced by a half, making the number of feature maps become two times the number of the feature maps before.

It is mentioned in the above that, when a feature map of a sample in the database is processed by the pooling layer of the CNN model, the feature map has both its length and width reduced by a half. Actually, in the CNN model, there are other cases making the length and width of the feature map be reduced by a half. According to the embodiment of the present disclosure, the number of the feature maps is doubled as long as the above cases occur.

According to an embodiment of the present disclosure, the selection unit 150 may establish each sample CNN model of the multiple sample CNN models in the following way: the number of feature maps after each of one or more pooling layers of the sample CNN model is two times the number of the feature maps before the pooling layer. That is to say, once the feature maps pass through a pooling layer, the number of feature maps is doubled. In the CNN model shown in FIG. 2, the number of feature maps after the convolution layer 2 is 16×s. And the number of feature maps after the pooling layer 1 becomes 32×s, that is, the number of feature maps is doubled.

According to an embodiment of the present disclosure, in order to establish the CNN model simply, the selection unit 150 may further set some constant parameters for the CNN model. The constant parameters may be empirical values, or, may be acquired by test and experiment, and a good performance of the CNN model is achieved by using these parameters.

For example, the selection unit 150 is configured to establish each sample CNN model of multiple sample CNN models in the following way: setting a convolution template for a convolution layer of the sample CNN model and a pooling template for a pooling layer of the sample CNN model. For example, the selection unit 150 may set a Rectified Linear Unit (ReLU) function as an activation function of the sample CNN model.

According to an embodiment of the present disclosure, setting the convolution template for the convolution layer may include one or more of: setting a magnitude of a convolution kernel, setting a convolution step size and setting a magnitude of a margin. For example, the convolution kernel may be set as 3 (in pixels)×3 (in pixels), the convolution step size may be set as 1 (in pixels), and the magnitude of the margin may be set as 1 (in pixels).

According to an embodiment of the present disclosure, setting the pooling template for the pooling layer may include one or more of: setting a size of the pooling template, setting a pooling step size and setting a pooling type. For example, the size of the pooling template may be set as 3 (in pixels)×3 (in pixels), the pooling step size may be set as 2 (in pixels), and the pooling type may be set as MAX (maximum).

In the above, only some exemplary methods for establishing a sample CNN model are illustrated. Of course, in order to further improve the performance of the CNN model, the selection unit 150 may further optimize the CNN model in other manners. For example, a BatchNorm layer or dropout layer is used for each convolution layer to improve a training effect of the CNN model.

As described in the above, the selection unit 150 may establish multiple sample CNN models, select a CNN model from the established sample CNN models as a candidate CNN model, and may transmit the selected candidate CNN model to the determination unit 130. Hence the determination unit 130 determines a classification capability of the candidate CNN model. In this case, the CNN model may be designed more simply since some parameters for the CNN model are preset. Further, the selection unit 150 firstly performs a selection on the sample CNN models, and then a candidate CNN model obtained via a matching of the matching unit 140 is more accurate.

In the above, the device 100 for determining the CNN model according to the embodiment of the present disclosure is described in detail. Next, a method for determining a CNN model according to an embodiment of the present disclosure is described in detail.

Figure 4:
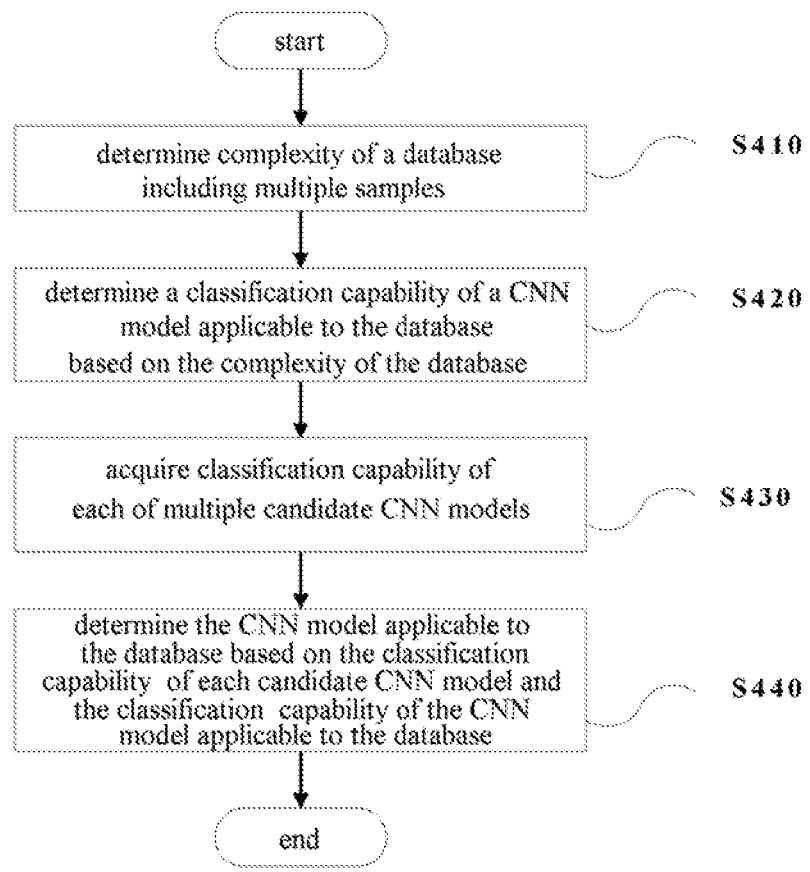
FIG. 4 shows a flowchart of a method for determining a CNN model according to an embodiment of the present disclosure.

FIG. 4 is a flowchart of a method for determining a CNN model according to an embodiment of the present disclosure.

As shown in FIG. 4, in step S410, complexity of a database including multiple samples is determined.

In step S420, it is determined a classification capability of a CNN model applicable to the database based on the complexity of the database.

In step S430, classification capability of each of the multiple candidate CNN models are acquired.

In step S440, the CNN model applicable to the database is determined based on the classification capability of each candidate CNN model and the classification capability of the CNN model applicable to the database.

Preferably, the determining the complexity of the database including multiple samples may include: selecting multiple parameters from a parameter group and determining the complexity of the database based on the selected multiple parameters. The parameter group includes a number of categories, an average number of samples, a sample equalization degree, a background complexity and a target clarity. The number of categories represents the number of categories for multiple samples in the database, the average number of samples represents an average value of the numbers of samples of the respective categories in the database, the sample equalization degree represents an equalization degree among the numbers of samples of the respective categories in the database, the background complexity represents complexity of an image background of the sample in the database, and the target clarity represents a difficulty of identifying a target from the samples in the database.

Preferably, the determining the complexity of the database based on the multiple parameters includes: determining weight and score of each of the multiple parameters, and determining the complexity of the database by weighting the scores of the respective parameters and summing the weighted scores.

Preferably, the determining the weight of each of the multiple parameter includes: forming a comparison matrix based on relative importance between each two parameters of the multiple parameters by using an analytic hierarchy process, and determining the weights of the respective parameters based on the comparison matrix.

Preferably, the determining the classification capability of the CNN model applicable to the database based on the complexity of the database includes: determining a value range of the classification capability of the CNN model applicable to the database based on the complexity of the database.

Preferably, the acquiring the classification capability of each candidate CNN model includes: determining a first parameter of the candidate CNN model and calculating the classification capability of the candidate CNN model based on the first parameter of the candidate CNN model. The first parameter represents a full extent to which the candidate CNN model is trained.

Preferably, the acquiring the classification capability of the candidate CNN model includes: calculating the classification capability of the candidate CNN model based on the first parameter, a second parameter and a third parameter of the candidate CNN model. The second parameter represents the number of convolution layers of the candidate CNN model, the third parameter represents a width parameter of the candidate CNN model which represents a multiplication factor of the number of feature maps of the candidate CNN model.

Preferably, the method may further include: establishing a correspondence between the candidate CNN models and their classification capabilities. And the determining the CNN model applicable to the database includes: determining a candidate CNN model corresponding to the classification capability of the CNN model applicable to the database as the CNN model applicable to the database.

Preferably, the establishing the correspondence between the candidate CNN models and their classification capabilities includes: grouping the multiple candidate CNN models to group candidate CNN models having same or similar classification capabilities into a same group, and making the candidate CNN model within the same group correspond to a representative classification capability of the same or similar classification capabilities corresponding to the group.

Preferably, the method may include selecting multiple candidate CNN models.

Preferably, the selecting multiple candidate CNN models includes: establishing multiple sample CNN models and selecting multiple sample CNN models of which second and third parameters meet a predetermined condition as the multiple candidate CNN models.

Preferably, the establishing the multiple sample CNN models includes: establishing each of the multiple sample CNN models in the following way: the number of feature maps after each of one or more pooling layers of the sample CNN model is two times the number of feature maps before the pooling layer.

Preferably, the establishing the multiple sample CNN models includes: establishing each of the multiple sample CNN models in the following way: setting a convolution template for a convolution layer of the sample CNN model and setting a pooling template for a pooling layer of the sample CNN model.

Preferably, the establishing the multiple sample CNN models includes: establishing each of the multiple sample CNN models in the following way: setting a ReLU function as an activation function of the sample CNN model.

The aforementioned method for determining a CNN model may be implemented by the device 100 for determining a CNN model according to the embodiments of the present disclosure. Therefore, the aforementioned embodiments of the device 100 for determining the CNN model are all applicable here, which are not repeated hereinafter.

It can be seen that, with the device and method for determining a Convolutional Neural Network (CNN) model, the classification capability of the CNN model applicable to the database can be determined based on the complexity of the database to select an appropriate CNN model from the candidate CNN models. In this case, the appropriate CNN model can be determined based on the complexity of the database, to make the determined CNN model more matching with the database. Further, a design process for CNN model is simplified, thereby allowing an ordinary person to design an appropriate CNN model for the database.

Apparently, the steps of the method for determining the CNN model according to the present disclosure may be implemented with computer executable programs stored in various machine readable memory mediums.

Moreover, the objectives of the present disclosure can also be achieved in the following manners. The memory medium in which the above executable program codes are stored is directly or indirectly provided to a system or device, and are read and executed by a computer, a central processing unit (CPU) or an graphic processing unit (GPU) in the system or device. In this case, as long as the system or device has a program execution function, the embodiments of the present disclosure are not limited to the program. And the program may has any form, such as a target program, a program executed by an interpreter or a script program provided to an operation system.

The above machine readable memory mediums include but are not limited to: various memories and memory units, semiconductor device, disk units such as optical disk, magnetic disk and magneto-optical disk, and other mediums adapted to store information.

In addition, by connecting the computer to a corresponding website on the Internet, the computer can downloads the computer program codes according to the present disclosure, installs the program codes in the computer, and then executes the program, thereby achieving the technical solution of the present disclosure.

Figure 5:
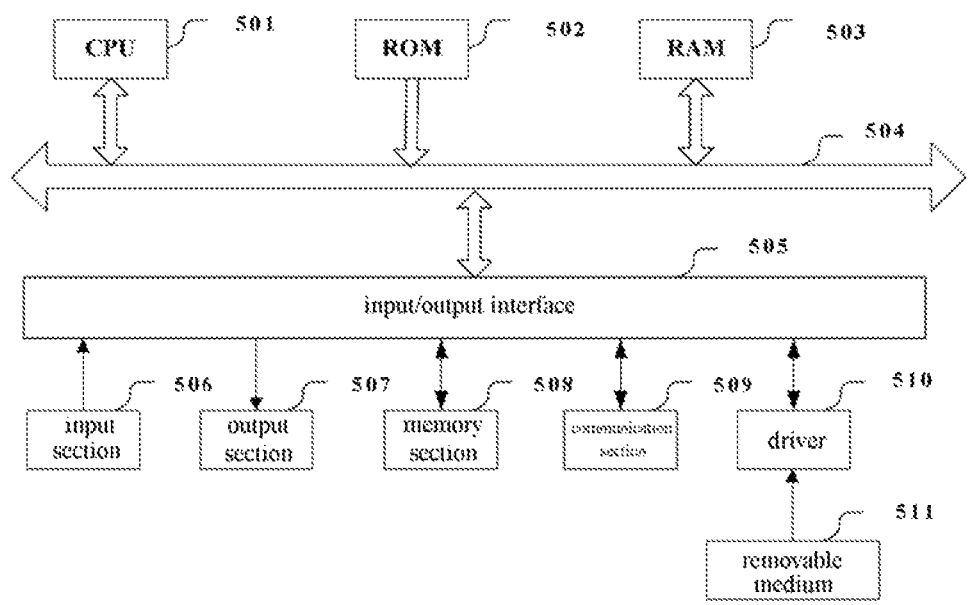
FIG. 5 is a block diagram of an exemplary structure of a general-purpose personal computer in which a method for determining a CNN model according to the present disclosure can be implemented.

FIG. 5 is a block diagram of an exemplary structure of a general-purpose personal computer, with which the method for determining a CNN model according to the present disclosure can be implemented.

As shown in FIG. 5, a central processing unit (CPU) 501 executes various processing according to a program stored in a read-only memory (ROM) 502 or a program loaded to a random access memory (RAM) 503 from a memory section 508. The data needed for the various processing of the CPU 501 may be stored in the RAM 503 as needed. The CPU 501, the ROM 502 and the RAM 503 are linked with each other via a bus 504. An input/output interface 505 is also linked to the bus 504.

The following components are linked to the input/output interface 505: an input section 506 (including keyboard, mouse and the like), an output section 507 (including displays such as a cathode ray tube (CRT), a liquid crystal display (LCD), a loudspeaker and the like), a memory section 508 (including hard disc and the like), and a communication section 509 (including a network interface card such as a LAN card, modem and the like). The communication section 509 performs communication processing via a network such as the Internet. A driver 510 may also be linked to the input/output interface 505 as needed. If needed, a non-transitory computer readable removable storage medium 511 such as a magnetic disc, an optical disc, a magnetic optical disc, a semiconductor memory may be installed in the driver 510, so that the computer program read from the removable medium 511 is installed in the memory section 508 as appropriate.

In the case where the foregoing series of processing is implemented with software, programs forming the software are loaded from a network such as the Internet or a memory medium such as the removable medium 511.

It should be appreciated by those skilled in the art that the memory medium is not limited to the removable medium 511 shown in FIG. 5, which has program stored therein and is distributed separately from the device so as to provide the programs to users, but may be a non-removable storage medium. The removable storage medium 511 may be, for example, a magnetic disc (including floppy disc (registered trademark)), a compact disc (including compact disc read-only memory (CD-ROM) and digital versatile disc (DVD)), a magneto optical disc (including mini disc (MD)(registered trademark)), and a semiconductor memory. Alternatively, the memory medium may be the hard discs included in ROM 502 and the memory section 508 in which programs are stored, and can be distributed to users along with the device in which they are incorporated.

In the system and method according to the present disclosure, the respective components or steps can be decomposed and/or recombined. These decompositions and/or recombinations shall be regarded as equivalent solutions of the present disclosure. Moreover, the above series of processing steps can naturally be performed temporally in the sequence as described above but will not be limited thereto, and some of the steps can be performed in parallel or independently from each other.

Although the embodiments of the present disclosure have been described above in detail in conjunction with the drawings, it shall be appreciated that the embodiments as described above are merely illustrative and are not intended to limit the present disclosure. Those skilled in the art can make various modifications and variations to the above embodiments without departing from the spirit and scope of the present disclosure. Therefore, the scope of the present disclosure is defined merely by the appended claims and their equivalents.

The following excursuses are disclosed according to embodiments including the above embodiments.

Excursus 1. A device for determining a Convolutional Neural Network (CNN) model, including:

a first determination unit, configured to determine complexity of a database including multiple samples;

a second determination unit, configured to determine a classification capability of a CNN model applicable to the database based on the complexity of the database;

a third determination unit, configured to acquire a classification capability of each of multiple candidate CNN models; and a matching unit, configured to determine the CNN model applicable to the database based on the classification capability of each candidate CNN model and the classification capability of the CNN model applicable to the database.

Excursus 2. The device according to excursus 1, wherein the first determination unit selects multiple parameters from a parameter group and determines the complexity of the database based on the selected multiple parameters, and the parameter group includes:

a number of categories, representing a number of categories for multiple samples in the database;

an average number of samples, representing an average value of the numbers of samples of the respective categories in the database;

a sample equalization degree, representing an equalization degree among the numbers of samples of the respective categories in the database;

a background complexity, representing a complexity of an image background of the sample in the database; and a target clarity, representing a difficulty of identifying a target from the sample in the database.

Excursus 3. The device according to excursus 2, wherein the first determination unit may be configured to determine weight and score of each of the multiple parameters and determine the complexity of the database by weighting the score of each of the multiple parameters and summing the weighted scores.

Excursus 4. The device according to excursus 3, wherein the first determination unit forms a comparison matrix based on relative importance between each two parameters of the multiple parameters by using an analytic hierarchy process, and determine the weight of each of the multiple parameters based on the comparison matrix.

Excursus 5. The device according to excursus 1, wherein the second determination unit is configured to determine a value range of the classification capability of the CNN model applicable to the database based on the complexity of the database.

Excursus 6. The device according to excursus 1, wherein the third determination unit is configured to determine a first parameter of the candidate CNN model representing a full extent to which the candidate CNN model is trained, and calculate the classification capability of the candidate CNN model based on the first parameter of the candidate CNN model.

Excursus 7. The device according to excursus 6, wherein the third determination unit is further configured to calculate the classification capability of the candidate CNN model based on the first parameter, a second parameter and a third parameter of the candidate CNN model, where the second parameter represents the number of convolution layers of the candidate CNN model, and the third parameter represents a width parameter of the candidate CNN model representing a multiplication factor of the number of feature maps of the candidate CNN model.

Excursus 8. The device according to excursus 1, wherein the third determination unit is further configured to establish a correspondence between the candidate CNN models and the classification capabilities, and wherein the matching unit is configured to determine a candidate CNN model corresponding to the classification capability of the CNN model applicable to the database as the CNN model applicable to the database.

Excursus 9. The device according to excursus 8, wherein the third determination unit is configured to group the multiple candidate CNN models to make the candidate CNN models having same or similar classification capabilities into a same group, and make the candidate CNN models within a same group correspond to a representative classification capability of the same or similar classification capabilities corresponding to the group.

Excursus 10. The device according to excursus 7, further including a selection unit configured to select multiple candidate CNN models.

Excursus 11. The device according to excursus 10, wherein the selection unit is configured to establish multiple sample CNN models, and select a sample CNN model, of which a second parameter and a third parameter satisfy a predetermined condition, as the candidate CNN model.

Excursus 12. The device according to excursus 11, wherein the selection unit is configured to establish each of the multiple sample CNN models in the following way: the number of feature maps after each of one or more pooling layers of the sample CNN model is two times the number of feature maps before the pooling layer.

Excursus 13. The device according to excursus 10, wherein the selection unit is configured to establish each of the multiple sample CNN models in the following way: setting a convolution template for each convolution layer of the sample CNN model and a pooling template for each pooling layer of the sample CNN model.

Excursus 14. The device according to excursus 10, wherein the selection unit is configured to establish each of the multiple sample CNN models in the following way: setting a ReLU function as an activation function of the sample CNN model.

Excursus 15. A method for determining a Convolutional Neural Network (CNN) model, including:

determining complexity of a database including multiple samples;

determining a classification capability of a CNN model applicable to the database based on the complexity of the database;

acquiring classification capability of each of multiple candidate CNN models; and determining the CNN model applicable to the database based on the classification capability of each candidate CNN model and the classification capability of the CNN model applicable to the database.

Excursus 16. The method according to excursus 15, wherein the determining the complexity of the database including multiple samples include: selecting multiple parameters from a parameter group and determining the complexity of the database based on the selected multiple parameters, and the parameter group includes:

a number of categories, representing a number of categories for multiple samples in the database;

an average number of samples, representing an average value of the numbers of samples of the respective categories in the database;

a sample equalization degree, representing an equalization degree among the numbers of samples of the respective categories in the database a background complexity, representing a complexity of an image background of the sample in the database; and a target clarity, representing a difficulty of identifying a target from the samples in the database.

Excursus 17. The method according to excursus 16, wherein the determining the complexity of the database based on the multiple parameters includes:

determining weight and score of each of the multiple parameters; and determining the complexity of the database by weighting the score of each of the multiple parameters and summing the weighted scores.

Excursus 18. The method according to excursus 17, wherein the determining the weights of the respective parameters includes:

forming a comparison matrix based on relative importance between each two parameters of the multiple parameters by using an analytic hierarchy process; and determining the weight of each of the multiple parameters based on the comparison matrix.

Excursus 19. The method according to excursus 15, wherein the determining the classification capability of the CNN model applicable to the database based on the complexity of the database includes:

determining a value range of the classification capability of the CNN model applicable to the database based on the complexity of the database.

Excursus 20, A machine readable memory medium, on which a program product including machine readable instruction codes stored therein is carried, where, when reading and executing the instruction codes, a computer can perform the method according to any one of Excursuses 15-19.

What is claimed is:

1. A device to determine a Convolutional Neural Network (CNN) model used to perform image classification on a database including multiple images, the device including a processor configured to:

determine complexity of the database;

determine a classification capability of a CNN model applicable to the database based on the complexity of the database;

acquire a candidate classification capability of each candidate CNN model of multiple candidate CNN models; and determine a selection of a CNN model, from among the candidate CNN models, applicable to the database based on the candidate classification capability of each candidate CNN model and the determined classification capability of the CNN model applicable to the database.

2. The device according to claim 1, wherein the processor is further configured to select multiple parameters from a parameter group and determine the complexity of the database based on selected multiple parameters, and the parameter group includes:

a number of categories representing sample categories for the images in the database;

an average number of samples representing an average value of a number of images of the categories in the database;

a sample equalization degree representing an equalization degree among the number of the images of the categories in the database;

a background complexity representing a background complexity of an image background of one of the images in the database; and a target clarity representing a difficulty of identifying a target from the one of the images in the database.

3. The device according to claim 2, wherein the processor is further configured to determine a weight and score of each of the multiple parameters and determine the complexity of the database by weighting the score of each of the multiple parameters and summing weighted scores.

4. The device according to claim 3, wherein the processor is further configured to form a comparison matrix based on relative importance between each of two parameters of the multiple parameters by using an analytic hierarchy process, and determine the weight of each of the multiple parameters based on the comparison matrix.

5. The device according to claim 1, wherein the processor is further configured to determine a value range of the classification capability of the CNN model applicable to the database based on the complexity of the database.

6. The device according to claim 1, wherein the processor is further configured to, for each candidate CNN model of the multiple candidate CNN models, determine a first parameter of the candidate CNN model representing a full extent to which the candidate CNN model is trained, and calculate the candidate classification capability of the candidate CNN model based on the first parameter of the candidate CNN model.

7. The device according to claim 6, wherein the processor is further configured to, for each candidate CNN model of the multiple candidate CNN models, calculate the classification capability of the candidate CNN model based on the first parameter, a second parameter and a third parameter of the candidate CNN model, where the second parameter represents a number of convolution layers of the candidate CNN model, and the third parameter represents a width parameter of the candidate CNN model representing a multiplication factor of a number of feature maps of the candidate CNN model.

8. The device according to claim 1, wherein the processor is further configured to establish a correspondence between the multiple candidate CNN models and classification capabilities, and determine the candidate CNN model among the multiple candidate CNN models corresponding to the classification capability of the CNN model applicable to the database as the selected CNN model applicable to the database based on the correspondence.

9. The device according to claim 8, wherein the processor is further configured to group multiple candidate CNN models to make the candidate CNN models having one of a same and similar classification capabilities into a same group, and make the candidate CNN models within the same group correspond to a representative classification capability of one of the same and the similar classification capabilities corresponding to the group.

10. The device according to claim 7, wherein the processor is further configured to select the multiple candidate CNN models.

11. The device according to claim 10, wherein the processor is further configured to establish multiple sample CNN models, and select multiple sample CNN models, from among the established multiple sample CNN models as the multiple candidate CNN models, each selected sample CNN model has a second parameter and a third parameter that satisfy a predetermined condition.

12. The device according to claim 11, wherein the processor is further configured to establish each sample CNN model of the established multiple sample CNN models to include one or more pooling layers and a number of feature maps after each of the one or more pooling layers that is two times a number of feature maps before the pooling layer.

13. The device according to claim 12, wherein the processor is further configured to establish each sample CNN model of the established multiple sample CNN models by setting a convolution template for each convolution layer of the established sample CNN model and a pooling template for each pooling layer of the sample CNN model.

14. The device according to claim 11, wherein the processor is further configured to establish each sample CNN model of the established multiple sample CNN models by setting a Rectified Linear Unit (ReLU) function as an activation function of the sample CNN model.

15. A method of determining by a processor a Convolutional Neural Network (CNN) model used to perform image classification on a database including a plurality of images, the method by the processor including:
   determining complexity of the database;
   determining a classification capability of a CNN model applicable to the database based on the complexity of the database;
   acquiring a candidate classification capability of each candidate CNN model of multiple candidate CNN models; and
   determining a selection of a CNN model, from among the candidate CNN models, applicable to the database based on the candidate classification capability of each candidate CNN model and the determined classification capability of the CNN model applicable to the database.

16. The method according to claim 15, wherein the determining the complexity of the database includes:
   selecting multiple parameters from a parameter group and determining the complexity of the database based on selected multiple parameters, and the parameter group includes:
      a number of categories representing a number of sample categories for the images in the database;
      an average number of samples representing an average value of a number of images of the categories in the database;
      a sample equalization degree representing an equalization degree among the numbers of images of the respective categories in the database
      a background complexity, representing a background complexity of an image background of one of the images in the database; and
      a target clarity representing a difficulty of identifying a target from the images in the database.

17. The method according to claim 16, wherein the determining the complexity of the database based on the multiple parameters includes:
   determining a weight and score of each of the multiple parameters; and
   determining the complexity of the database by weighting the score of each of the multiple parameters and summing weighted scores.

18. The method according to claim 17, wherein the determining the weight of respective parameters includes:
   forming a comparison matrix based on relative importance between each of two parameters of the multiple parameters by using an analytic hierarchy process; and
   determining the weight of each of the multiple parameters based on the comparison matrix.

19. The method according to claim 15, wherein the determining the classification capability of the CNN model applicable to the database based on the complexity of the database includes:
   determining a value range of the classification capability of the CNN model applicable to the database based on the complexity of the database.

20. A non-transitory machine readable storage medium, on which a program product including machine readable instruction codes stored therein is carried, where, when reading and executing the instruction codes, a computer can perform the method according to claim 15.

* * * * *